(12) United States Patent
Miller et al.

(10) Patent No.: US 9,698,401 B2
(45) Date of Patent: *Jul. 4, 2017

(54) EMBOSSED SEPARATORS, BATTERIES AND METHODS

(71) Applicant: Daramic, LLC, Charlotte, NC (US)

(72) Inventors: Eric H. Miller, Philpot, KY (US); Jeffrey K. Chambers, Philpot, KY (US); John R. Timmons, Owensboro, KY (US)

(73) Assignee: Daramic, LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/254,350

(22) Filed: Sep. 1, 2016

(65) Prior Publication Data
US 2016/0372732 A1    Dec. 22, 2016

Related U.S. Application Data

(63) Continuation of application No. 14/003,304, filed as application No. PCT/US2012/066233 on Nov. 21, 2012, now Pat. No. 9,461,291.

(60) Provisional application No. 61/562,195, filed on Nov. 21, 2011, provisional application No. 61/692,058, filed on Aug. 22, 2012.

(51) Int. Cl.
| | |
|---|---|
| *H01M 2/18* | (2006.01) |
| *H01M 2/16* | (2006.01) |
| *H01M 2/14* | (2006.01) |
| *H01M 10/12* | (2006.01) |
| *H01M 10/0585* | (2010.01) |
| *H01M 4/14* | (2006.01) |
| *H01M 10/06* | (2006.01) |

(52) U.S. Cl.
CPC ............. *H01M 2/18* (2013.01); *H01M 2/145* (2013.01); *H01M 2/1653* (2013.01); *H01M 2/1666* (2013.01); *H01M 10/12* (2013.01); *H01M 2/166* (2013.01); *H01M 4/14* (2013.01); *H01M 10/0585* (2013.01); *H01M 10/06* (2013.01); *Y02E 60/126* (2013.01)

(58) Field of Classification Search
CPC ........ H01M 2/18; H01M 2/145; H01M 10/12; H01M 2/1666; H01M 2/1653
See application file for complete search history.

(56) References Cited

U.S. PATENT DOCUMENTS

| | | | | | |
|---|---|---|---|---|---|
| 4,369,236 | A | * | 1/1983 | O'Rell | H01M 2/18 429/147 |
| 4,403,024 | A | * | 9/1983 | Gordon | H01M 2/18 264/104 |
| 5,035,967 | A | * | 7/1991 | Hasegawa | H01M 2/18 429/147 |
| 5,679,479 | A | * | 10/1997 | Young | H01M 2/145 264/284 |

(Continued)

*Primary Examiner* — Stewart Fraser
(74) *Attorney, Agent, or Firm* — Meunier Carlin & Curfman LLC

(57) ABSTRACT

An improved, new, modified, or more robust embossed battery separator for a storage battery, a method for its production, an envelope embossed separator, batteries including the embossed separators and/or envelopes, and/or related methods for the production and/or use of the embossed separators, embossed envelopes, and/or batteries including such embossed separators and/or envelopes.

29 Claims, 22 Drawing Sheets

Cycle-Life Improvement

- Prevents Shedding of PAM
- Oxidative Resistant
- Maximize Acid Availability
- Minimize Entrapped Gas

Separator with Optimized Laminate

(56) References Cited

U.S. PATENT DOCUMENTS

| | | | | |
|---|---|---|---|---|
| 5,789,103 A * | 8/1998 | Young | ............... | H01M 10/14 264/286 |
| 5,985,484 A * | 11/1999 | Young | ............... | H01M 2/18 429/143 |
| 9,461,291 B2 * | 10/2016 | Miller | ............... | H01M 2/145 |
| 2005/0014063 A1 * | 1/2005 | Shi | ............... | H01M 2/145 429/144 |
| 2011/0177375 A1 * | 7/2011 | Pfanner | ............... | H01M 2/145 429/146 |
| 2013/0344373 A1 * | 12/2013 | Miller | ............... | H01M 2/145 429/143 |

\* cited by examiner

New Embossed Separator

Embossing Paradigm Change

- Don't use a flat sheet precursor but an easy to produce smaller ribbed product to emboss a higher thickness resilient separator.
  - Old process - created ribs for thickness at the beginning of process. This adds mass, slows extraction, adds complexity, etc.
  - New process - create height at the slitter
    - Embossed ribs are smashed into an internal reinforced network providing resiliency to maintain its shape
    - Emboss from 1mm up to 2mm range preferably
    - Rearranging mass reduces detectable pin holes and increases width

FIGURE 2

Example of New Concept

Extrusion of old BBV 1.25mm precursor

Fast Extraction over 100 fpm

New Finishing (after extraction)-
Emboss on line to 1.80mm
using opposing male and female
embossing rollers

Compression & Resiliency

- Typical PE battery separator specifications are +/- 3 mils for overall thickness. This is less than 5% variation from the desired target thickness. A preferred separator Compression performance is less than 5% at 5PSI from target for the new embossed separator.

- Resiliency is the ability of the separator to maintain the desired thickness after the repeated compressions over the life of the separator. Less than 5% change over repeated measurements (for example, 200 or more TMI strikes at 5PSI) in the same location is preferred for the new embossed separator.

FIGURE 4

Embossed ER

Definitions
R/F major ribs to female embossing roller
R/M major ribs to male embossing roller

| Profile | ER mohm-in2 |
|---|---|
| AA R/F | 11.3 |
| AA R/M | 11.6 |
| AA CTRL | 9.6 |
| AVG % change in ER | -19% |
| BB R/M | 14.9 |
| BB R/F | 14.2 |
| BB CTRL | 10 |
| AVG % change in ER | -46% |
| CC R/M | 15.5 |
| CC R/F | 16.2 |
| CC CTRL | 11.4 |
| AVG % change in ER | -39% |
| DD R/F | 28.8 |
| DD R/M | 27.2 |
| DD CTRL | 24.5 |
| AVG % change in ER | -14% |

FIGURE 6

Rearranging Mass

- Pin holes are closed (Self Healing)
  - 1 meter sample major ribs toward male embossing tool 9 of 10 holes non-detectable
  - 1 meter sample major ribs toward female embossing tool 5 of 10 holes non-detectable
- Width increase up to 5%
- May increase yield & thru put
- Creation of internal skeletal frame work for increased thickness resiliently

FIGURE 7

Cycle-Life Improvement

- Prevents Shedding of PAM
- Oxidative Resistant
- Maximize Acid Availability
- Minimize Entrapped Gas Separator with Optimized Laminate

Advantages of the Daramic PE Separator

Smallest Pore Size

The maximum pore size of a Daramic PE Separator is less than 1 micron with an average pore size of about 0.1 micron. Separators made from SWP and other types of composite paper and sintered PVC have a much larger pore size which is detrimental to battery life as it is prone to dendrite growth and shorts resulting in battery failure.

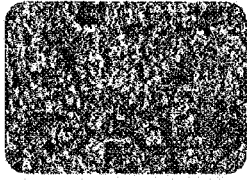
Daramic PE

SWP/ Composite/ Other

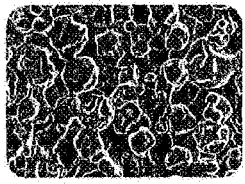
Sintered PVC

Note: The magnified pictures demonstrate the relative pore size of various types of separators.

Very Low Electrical Resistance

Daramic PE Separator can be manufactured with a lower web thickness and hence has a significantly lower Electrical Resistance than other conventional separators like PVC, SWP and other composite separators. Lower Electrical Resistance results in enhanced battery performance even at cold cranking conditions.

Low Acid Displacement

Availability of sufficient acid is very essential for the electrochemical reaction. Given the internal dimensions of the battery container, with more acid around the plates, there are less chances of a dry-out that would result in battery failure. Low backweb and high porosity of the Daramic PE Separator displaces less acid resulting in more acid availability around the plates.

Characteristics of Daramic PE Separator

Daramic PE Separators are manufactured to stringent quality specifications that result in high puncture resistance, very small pore size, low electrical resistance, high porosity and a high resistance to oxidation due to the presence of a special mineral oil and anti-oxidants. This is to ensure that the battery does not fail due to puncture.

Fig. 16

Introducing the Daramic PE Leaf Separator

Daramic Auto PE Leaf Separator

Daramic Auto PE Leaf Separator is made out of Daramic-HP grade PE separator laminated with Glassmat and cut to required size to meet the specification of customers. The lamination of a thicker layer of Glassmat on the PE separator base renders sufficient rigidity to the product for easy insertion between the plates, without compromising the basic qualities and advantages of Daramic PE. The Glassmat serves to retain the acid around the plate and is beneficial for battery performance due to its dual function of maintaining positive plate integrity as well as increasing the oxidation resistance the PE separator. The Glassmat holds the plate tightly resulting in reduced plate shedding caused by vibration.

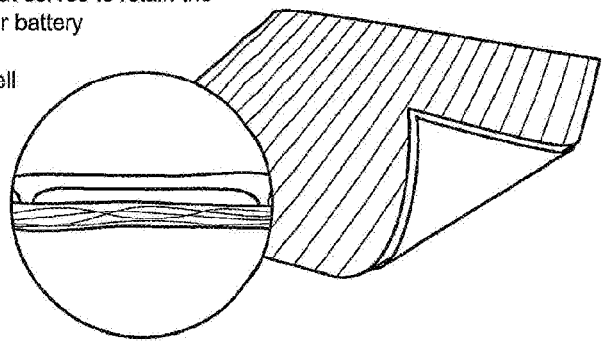

Daramic Industrial PE Leaf Separator

The Daramic Industrial PE Leaf Separator is available in two versions. For the standard high-discharge application, Glassmat is glued to Daramic PE Separator base which has a higher web thickness of around 0.35 mm. The Glassmat (optional) prevents the PE separator base from coming into contact with the positive plate under oxidative conditions, which enhances the cycle life of the PE separator. The higher backweb thickness as compared to an Auto PE separator also gives a longer life to the separator. These separators can be used in Flat Plate Inverter batteries.

For heavy duty applications as in tubular batteries, Daramic recommends the usage of PE separator with a web thickness of 0.45 mm. In addition, the specially designed angular diagonal / sinusoidal front rib on the PE separator significantly reduces the physical contact of the separator back web with the tubular positive plates. The 0.45mm back web thickness will protect the separator from getting oxidized for a longer period in deep cycle applications.

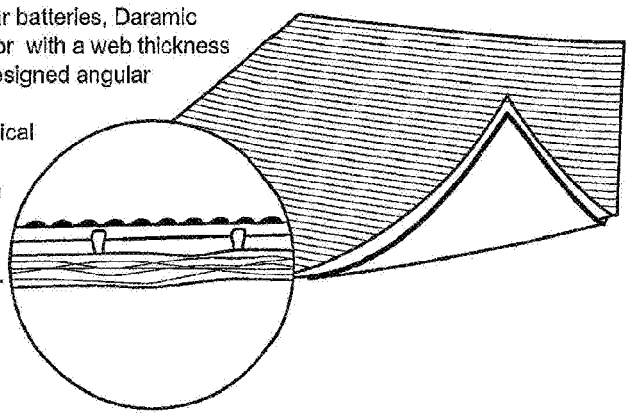

Fig. 17

Separator Comparison

| Characteristics | PE | PVC | Composite Paper | Advantages of PE |
|---|---|---|---|---|
| Average Pore Size (microns) | 0.1 | 15 | 10 | Avoids dendrite shorts |
| Maximum Pore Size (microns) | <1 | 30 | 20 | |
| Electrical Resistance (ohm cm. sq.) | 0.065 | 0.25 | 0.085 | Low electrical resistance enhances cranking performance and also results in higher current output |
| Porosity | 60% | 35% | 74% | |
| Acid Displacement (ml/ sq. m) | 125 | 385 | 130 | Low acid displacement contributes to more active acid in the battery resulting in better performance |
| Oxidation Resistance (hours) | 840 | 300 | 350 | Maximum oxidation resistance in PE Separator with Glass Mat among all separators, contributing to higher life of batteries |
| Puncture Resistance | Good | Very Good | Satisfactory | High puncture resistance in PE Separator protects the separator from the rough edges of the Plate. |

Choice of Usage

Daramic provides you with a choice of procuring the Daramic PE Separator in an Envelope(with or without Glassmat) form, Sleeve form, and in our very new, Leaf form.

Fig. 18

New Embossed Separator

Example of New Concept

Extrusion of old BBV 1.25mm precursor

Fast Extraction over 100 fpm

New Finishing (after extraction)- Emboss on line to 1.80mm using opposing male and female embossing rollers

EMBOSSED SEPARATORS, BATTERIES AND METHODS

CROSS REFERENCE TO RELATED APPLICATIONS

This application is a continuation of U.S. application Ser. No. 14/003,304, filed Nov. 21, 2012, as a national stage application under 35 U.S.C. §371 of International Application PCT/US12/66233, filed Nov. 21, 2012, which claims the benefit of U.S. Provisional Applications 61/562,195, filed Nov. 21, 2011, and 61/692,058, filed Aug. 22, 2012, each of which are hereby incorporated by reference herein.

FIELD OF THE INVENTION

In accordance with at least selected embodiments, the invention relates to embossed battery separators, separator envelopes, composites, laminates, batteries, energy storage devices, and/or methods, and/or improved, new, modified, and/or more robust embossed battery separators, separator envelopes, composites, laminates, batteries, and/or methods. In accordance with at least certain embodiments, the invention relates to improved, new, modified, and/or more robust embossed battery separators, separator envelopes, batteries, and/or methods for storage batteries, to methods of production, to envelope embossed separators, to batteries including the embossed separators and/or envelopes, and/or to related methods for the production and/or use of the embossed separators, embossed envelopes, and/or batteries including such embossed separators and/or envelopes. In accordance with at least certain selected embodiments, the invention relates to improved, new, modified, or more robust embossed battery separators for lead-acid or storage batteries, to methods for production, to envelope embossed separators, to batteries including the embossed separators and/or envelopes, and/or to related methods for the production and/or use of the embossed separators, embossed envelopes, and/or batteries including such embossed separators and/or envelopes.

BACKGROUND

Separators currently used in lead acid (or storage) batteries are microporous films of sheet material that prevent shorting between neighbouring electrode plates of opposite polarities and plate material from falling out, but on account of their porous structure permit ionic current flow in the electrolyte. Separators of this kind are known from, for example, U.S. Pat. Nos. 3,351,495, 4,927,722, and 5,776,630 and from, for example, WO publication WO 2001/013,442, each hereby incorporated herein by reference. Typical polymers these separators are made from include polyolefins such as high molecular weight polyethylene (e.g., ultra high molecular weight polyethylene, UHMWPE). Such separators may include a filler and are normally provided on at least one side with longitudinal ribs that are intended to prevent direct contact of the flat sheet material with the positive electrode plate and maintain the spacing between the opposing electrodes. These ribs also lend the separator a certain rigidity in the longitudinal direction. Longitudinal ribs of this kind are typically formed by feeding the precursor between a grooved calender roll and a smooth surface calender roll.

Separators are usually manufactured by slot die extrusion of a thermoplastic into a film (or precursor) that is then calender rolled into a sheet material with the prescribed ribs, after which the pore former, such as mineral oil, is extracted and the porous sheet material or web is wound into rolls. This porous sheet material is later drawn off the roll and cut into strips of the desired width. These strips are cut to the desired length to form separator pieces (or leaves) or to form lengths that are then folded over either a positive or a negative electrode plate to form an envelope, the two peripheral regions of which can be joined by, for example, heat sealing, pressure welding or other processes that are known to form a pocket or envelope. Electrode plates are then assembled into groups for a storage battery, plates in separator envelopes alternating with plates of opposite polarity without envelopes. In general, only electrode plates of a single polarity are placed in envelope separators; in special cases, however, electrode plates of both polarities can be placed in envelope separators. The electrode plates within a group are aligned and then joined together.

The alignment of the electrode plates may result in individual electrode plates being pushed to a greater or lesser extent into one or the other peripheral region of an envelope separator. Because the electrode plates frequently acquire pointed tips or sharp edges depending on the manufacturing process, this displacement can cause a point or edge of an electrode plate to puncture the separator material, which in turn can result in shorting with the neighbouring electrode. This is especially the case when the electrode plates used consist of a grid of, for example, expanded or stamped metal into which the actual active material is incorporated, as described for example in EP published application EP-A-0 994 518. In such cases it may occur that the expanded material is not cut precisely at the nodes, so that individual grid wires project from the electrode plates, bend slightly on alignment of the electrode plates and puncture the thin sheet material of the separator.

As such, there exists a need for improved, new, modified, or more robust separators and/or envelopes, improved, new, or modified separator and/or envelope manufacturing processes, improved, new, modified, or more robust batteries including such separators, envelopes, and/or the like for at least certain applications, uses, efficiencies, and/or the like.

SUMMARY OF THE INVENTION

In accordance with at least selected embodiments, an improved, new, modified, and/or more robust battery separator and/or envelope for a lead acid (storage) battery is made from an embossed thermoplastic sheet material, preferably an embossed ribbed porous thermoplastic sheet material. The sheet material has a central region flanked by peripheral regions. At least, the central region includes a plurality of longitudinally extending ribs that are preferably integrally formed from the sheet material (by, for example, calendering) and at least the central region includes a plurality of longitudinally extending superimposed embossed ribs that are preferably formed by, for example, a pair of male and female embossing rolls that modify or reform the overall thickness, and/or the shape and/or density of at least portions of the separator. In at least one embodiment or example, the central region of the precursor or un-embossed sheet includes a plurality of longitudinally extending straight ribs that are preferably integrally formed from the sheet material (by, for example, calendering) and at least the central region includes a plurality of longitudinally extending superimposed embossed sinusoidal ribs that are preferably formed by, for example, a pair of male and female embossing rolls that modify or reform the overall thickness, and/or the shape and/or density of at least portions of the separator, with the embossed ribs being larger than the straight ribs. In accordance with the present invention, the ribbed porous thermoplastic sheet material is embossed (preferably just before, during, or after slitting or before or during enveloping) to increase its thickness, resiliency, and/or compression, and/or to form an internal reinforced network, to rearrange mass, to reduce pin holes, and/or the like. Also disclosed are a method of producing the foregoing embossed separator, an envelope embossed separator made from the embossed sheet material, and/or a method of making a battery and/or using the embossed separator and/or envelope embossed separator.

It is therefore at least one object of at least one embodiment of the present invention to provide an improved, new or modified battery separator for a storage battery, and to provide an improved, new or modified method for producing such separators.

It is a further object of at least one embodiment of the present invention to provide an improved, new or modified envelope separator for an electrode plate of a storage battery as well as an improved, new or modified method for its production.

It is yet another object of at least one embodiment of the present invention to provide an embossed battery separator, an improved method for producing such separators, and/or an improved method for using such separators.

In accordance with at least certain embodiments, there are provided an improved embossed separator and method of its production wherein a ultra high molecular weight polyethylene (UHMWPE) silica filled microporous separator membrane having a densified rigid internal skeletal frame imparted by compressing the major ribs of the precursor separator into an embossed internal densified skeletal structure within a non-homogeneous densified separator membrane. The embossing also preferably increases the overall thickness over the starting precursor ribbed membrane thickness (in one example, an about 1.25 mm overall thickness precursor is embossed to have an about 1.80 mm overall thickness). Such a rigid internal skeletal structure preferably improves oxidation resistance, increases thickness compression resiliency and reduces cost over existing non-embossed separators or embossed flat membranes where no internal skeletal frame work exists. Surprisingly, the redistribution of rib mass also creates a self-healing effect of reducing the size and number of pin holes.

In accordance with at least a particular embodiment, a preferred embossed ribbed separator or separator envelope comprises a UHMPE silica filled microporous separator membrane embossed after extraction and calendering (rib formation) to impart a new larger embossed rib profile, a densified rigid internal skeletal frame by compressing the major ribs of the precursor separator into an embossed internal densified skeletal structure within a non-homogeneous densified separator membrane, an increased overall separator thickness over the starting precursor ribbed membrane, an improved oxidation resistance, an increased thickness compression resiliency, a reduced cost over existing non-embossed, un-embossed or embossed flat membranes (not having an internal densified skeletal frame), a self-healing pin hole reduction effect, less mass than conventional industrial separators of the same overall thickness, and/or the like.

At least selected embodiments of the present invention overcome or address the disadvantages (tears, pin holes, lack of porosity, etc.) of the prior art embossed "flat" separators (made from flat or substantially flat precursors). The new paradigm of the present invention is to use a calendered ribbed precursor and redistribute the mass (ribs) by embossing (for example, by superimposing a larger embossed rib profile on and over the calendered rib profile, smashing the calendered ribs and densifying the structure in select locations preferably corresponding to the old ribs). Contrary to past thinking, the new inventive separator uses a ribbed precursor rather than a flat "sheet" or sub-micron rib precursor. At least certain prior embossed flat sheet battery separators for flooded lead acid batteries may have inferior oxidization resistance, pin holes and thin regions caused by stretching during the embossing process.

In accordance with certain embodiments or aspects of the present invention, we emboss a ribbed separator profile so that the compressed ribs form a skeletal network and a non-homogenous membrane with different densities to improve physical and/or performance properties such as oxidative properties.

In accordance with at least selected embodiments or aspects of the present invention, embossing a low cost ribbed polyethylene (PE) separator to reform its shape into a thicker separator while maintaining all key separator performance properties, reduces cost, reduces complexity (SKUs), and/or reduces mass.

In accordance with at least certain embodiments or aspects of the present invention, a densified skeletal frame increases the resiliency of the embossed shape over time and reduces the likelihood of oxidative attack thus extending the cycle life of the energy storage device.

In accordance with at least selected embodiments or aspects of the present invention, the inventive methods and processes may reduce cost and complexity of the separator and/or envelope manufacturing processes for at least PE separator and/or envelope manufacturing, by adding thickness at the end of the manufacturing process (by embossing) rather than only at the beginning (by calendering).

In accordance with at least certain embodiments or aspects of the present invention, the new embossed ribbed separators and/or envelopes may reduce acid stratification by providing longitudinal flow channels to enhance electrolyte pumping action during the overcharge. The phenomena of acid stratification may also be addressed through the void space created when two or more layers are co-embossed together. For example, the void space between a PE separator membrane and a glass mat (or fiber layer) in a separator and mat (or fiber) laminate structure may promote wicking resulting in random interaction and impingement on the fiber matrix or mat.

In accordance with at least selected embodiments or aspects of the present invention, the inventive embossing process has potential to increase membrane surface area for cross-flow/ultrafiltration applications, specifically applications currently utilizing modular cassettes. There may also be increased utility in spiral wrap configurations where the effective surface area is important.

In accordance with at least certain examples, embodiments or aspects of the present invention, an embossed 1 mm thick ribbed separator precursor (embossed to have a final product 2 mm thickness) can replace a conventional 2 mm ribbed separator (providing reduced cost, mass, and/or complexity, and increasing manufacturing capacity significantly).

In accordance with at least certain embodiments or aspects of the present invention, the ability to impart thickness at the finishing step of the separator production process adds flexibility to the process. For example, products over 1 mm up to 2 mm could see a significant drop in mass and cost and conversely an increase in production speed. The shipping of a thinner precursor (prior to embossing) would also reduce precursor shipping volume and cost.

In accordance with at least selected embodiments or aspects of the present invention, new embossed ribbed separators are manufactured by slot die extrusion of a thermoplastic into a film that is then calender rolled into a ribbed sheet material with the prescribed rib profile (on one or both sides), after which the pore former, such as mineral oil, is extracted and the ribbed sheet material (calender ribbed precursor) so formed is wound into rolls. This porous ribbed sheet material is later drawn off the roll, embossed (to, for example, add thickness or densify) and cut into strips of the desired width. These embossed strips are cut to the desired length and then folded over either a positive or a negative electrode plate to form an embossed envelope, the two peripheral regions of which can be joined by, for example, heat sealing, pressure welding or other known processes. Electrode plates are then assembled into groups for a storage battery, plates in embossed separator envelopes alternating with plates of opposite polarity without envelopes. In general, only electrode plates of a single polarity are placed in envelope separators; in special cases, however, electrode plates of both polarities can be placed in envelope separators. The electrode plates within a group are then aligned and joined together.

The preferred goal of the separator is to keep the plate distance the same over time. The present embossed PE separators have very little change over time so they maintain the desired thickness and plate spacing over time. A change in thickness, resiliency, compression, or the like of less than or equal to 5% is preferred and is inside typical battery separator overall thickness specifications.

In accordance with at least selected co-embossment embodiments, additional rollstock material may enter the embossment process simultaneous to the ribbed separator membrane described above. Examples of such materials are not limited to fibrous nonwovens of synthetic, cellulosic or hybrid non-woven combinations thereof. The non-woven materials comprise a wide range of thicknesses, denier, basis weights, and surface chemistries. Of particular interest are non-woven compositions utilized as foundations for active material deposition within the battery manufacturing process. These non-wovens, commonly known as pasting papers may be functionalized chemically or may be treated in such a manner as to adhere particulate material with capability to produce gelling structures through which electrolyte is captured and held in situ in juxtaposition to the electrode surface thereby providing potential benefit in battery electrochemical performance.

In addition to gelling agents adhered to materials undergoing co-embossment with the separator membrane, other materials may be deployed that have impact on battery performance. These materials include but are not limited to, Sodium Sulfate to enhance electrolyte properties, chemically active minerals to scavenge contaminates from electrolyte and carbonaceous materials to enhance charge acceptance properties and enhance surface area.

A possibly preferred benefit within a co-embossment embodiment is the replacement of fixatives to attach laminate materials to the separator surface. The fixatives such as industrial glues contain organic compounds which provide a source of total oxidizable carbon (TOC) to the battery system. Many organic compounds become electrochemically unstable upon sustained exposure to the oxidizing environment of the battery resulting in TOC levels that may contribute to premature failure of the battery. Over the cycle life of a battery, the adhesives utilized may break down under oxidative attack allowing laminate materials to become free from the separator.

Yet another possibly preferred benefit from a co-embossment embodiment is the physical strength enhancement achieved by producing a monolithic structure comprised by such co-embossed materials. Biaxial stiffness, enhanced oxidation resistance and enhanced fluid transport properties (laterally and in the Z axis) may be positively affected.

The embossed ribs, patterns, deigns, features, and/or properties are not limited, may be varied by varying the embossing tooling, the materials being embossed, any additives or agents, and/or the like.

BRIEF DESCRIPTION OF THE DRAWINGS

The present invention may be better understood when considering the description of the invention along with the following drawings which illustrate selected exemplary embodiments, examples or aspects of the invention.

FIG. 2 is a description of the new paradigm.

FIG. 4 is a description of compression and resiliency.

FIG. 6 is a table regarding change in ER.

FIG. 7 is a description regarding rearranging mass.

FIGS. 11 and 21 are respective images of the same embodiment. Likewise, FIGS. 14 and 22 are respective images of the same embodiment.

FIG. 16 shows several respective SEMs of several separator products.

FIG. 17 shows perspective views of additional examples of laminate or composite precursors (before embossing).

FIG. 18 is a table of data related to FIG. 16.

DETAILED DESCRIPTION

Figure 1:
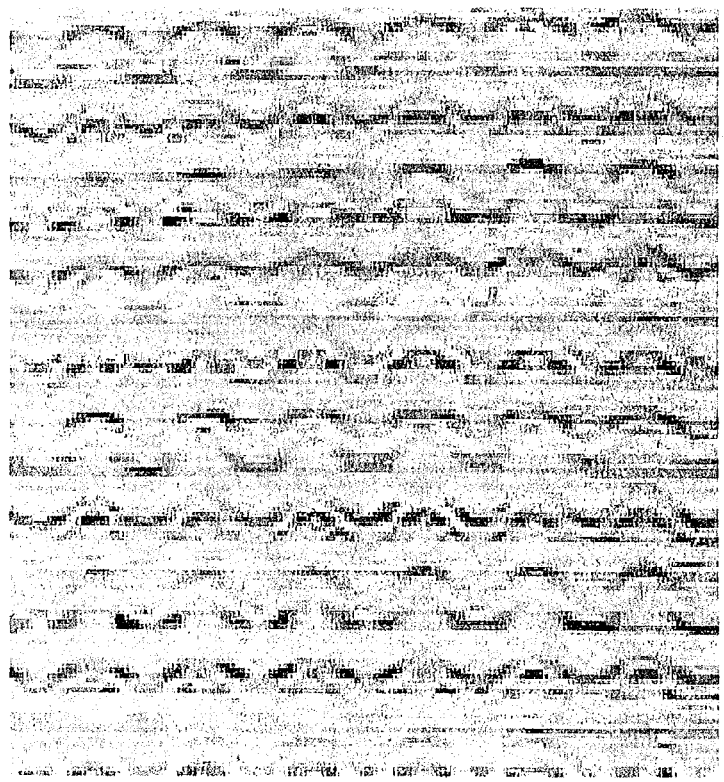
FIGS. 1 and 19 are plan view images of an embossed battery separator made according to at least one embodiment of the present invention.
Figure 3:
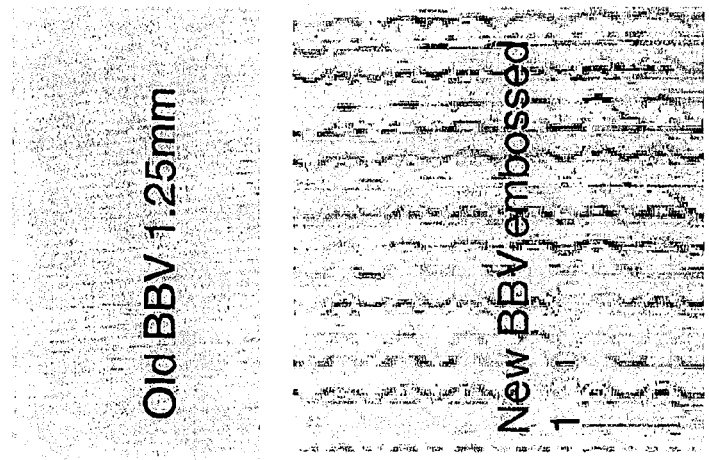
FIGS. 3 and 20 are examples of embossing a ribbed precursor (BBV 1.25 mm) to form the embossed separator shown in FIGS. 1 and 19 (new embossed BBV 1.80 mm).
Figure 5:
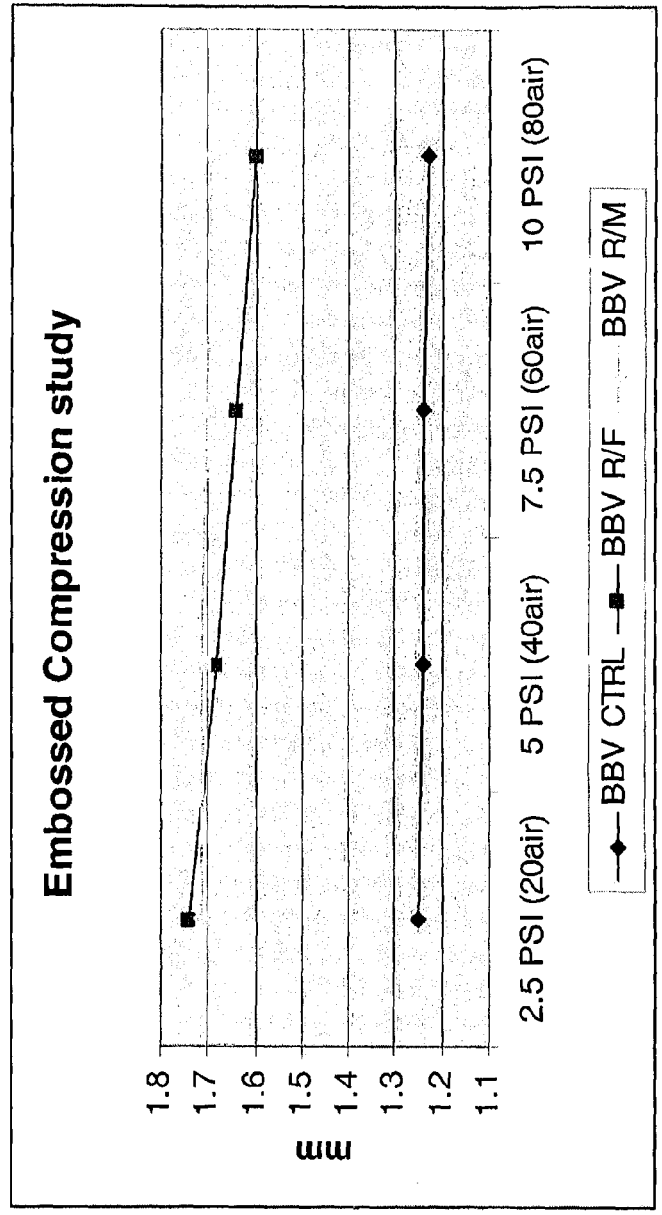
FIG. 5 is a graphical representation of compression data.
Figure 8A:
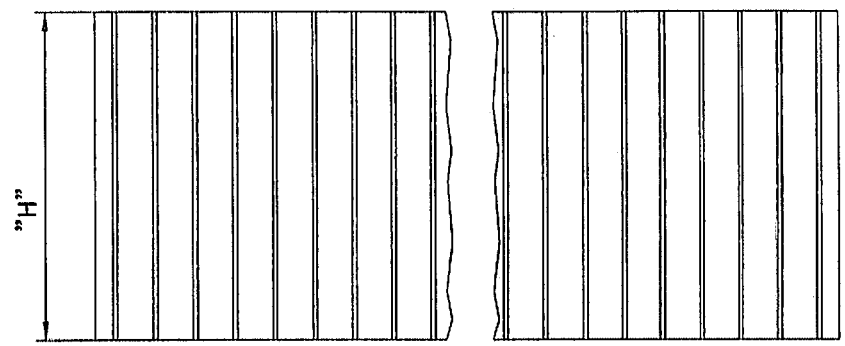
FIGS. 8A, 8B and 8C are a plan view, an end view and an enlarged partial end view illustrations, respectively, of a possibly preferred ribbed precursor example, such as a BBV 1.25 mm having, for example, dimensions of an H of 100 to 200 mm or more, a W of about 500 mm or more (prior to slitting), a T of about 1.25 mm, and a B of about 0.5 mm.
Figure 8B:
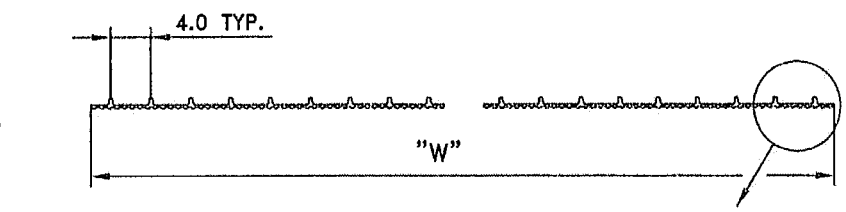
Figure 8C:
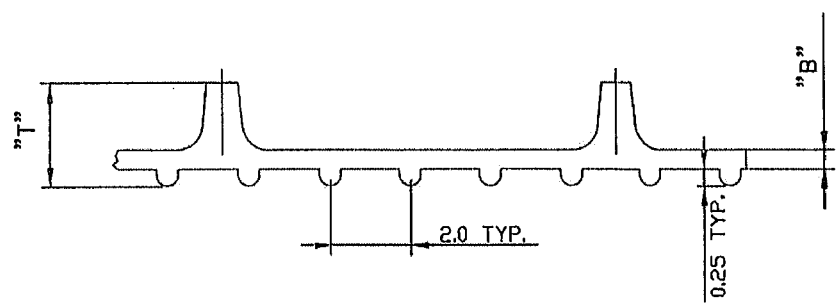
Figure 9:
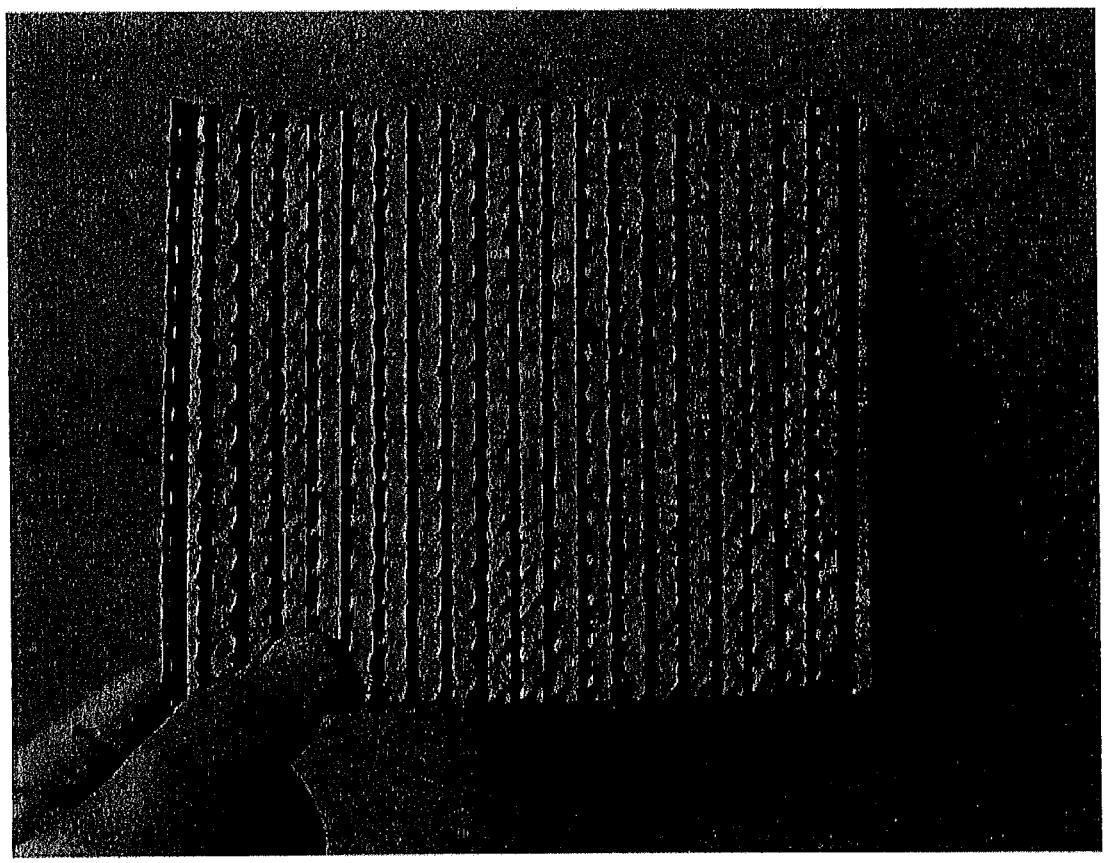
FIG. 9 is a plan view image of an exemplary embossed envelope separator of at least one embodiment of the present invention. The dark stripes represent increased density areas.
Figure 10:
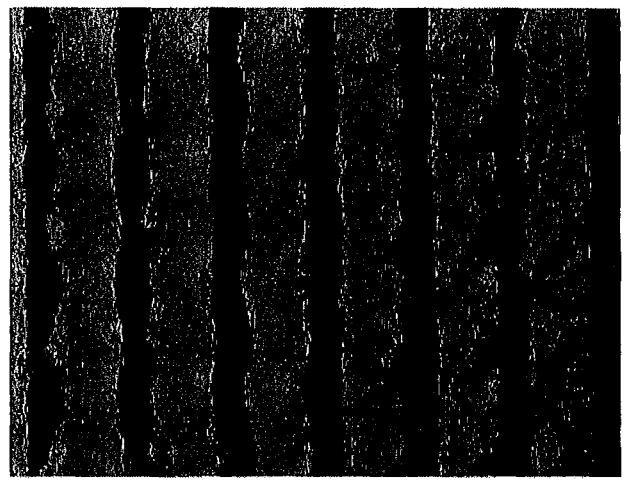
FIG. 10 is an enlarged image of a portion of the embossed separator of FIG. 9.
Figure 11:
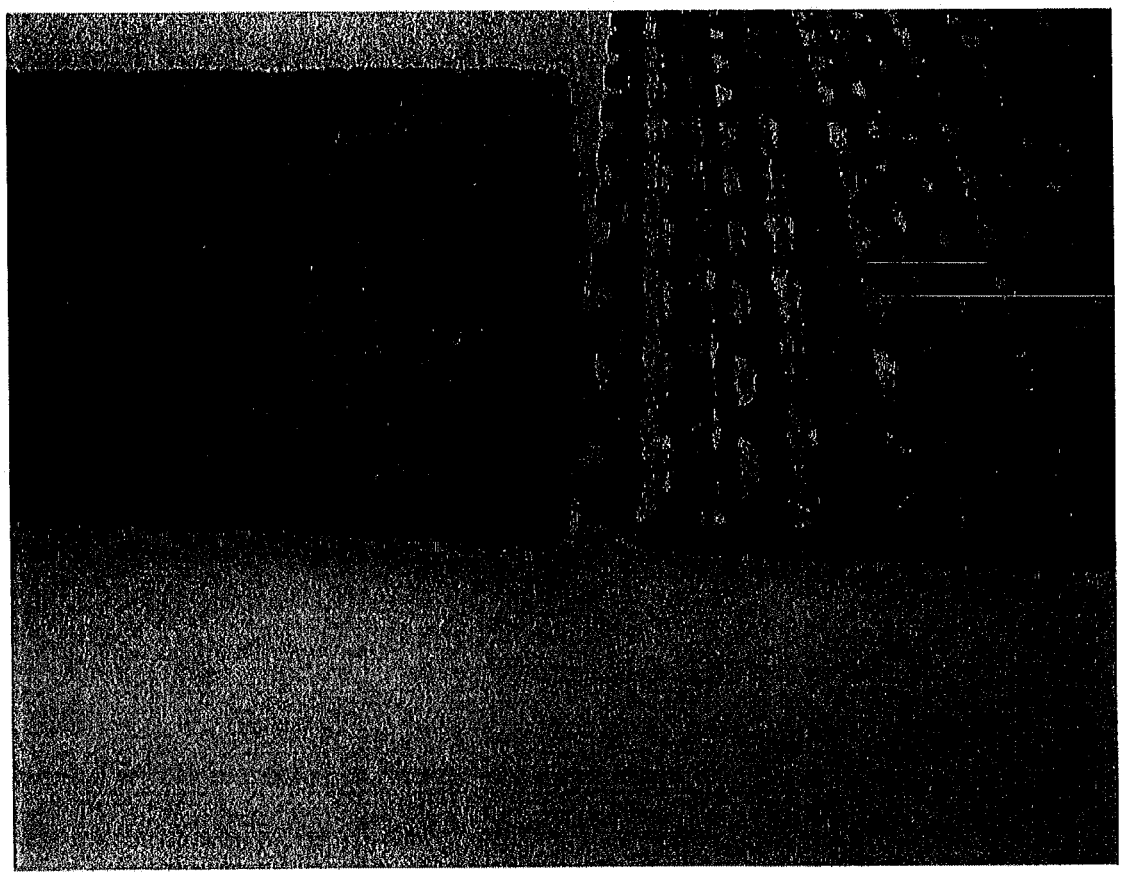
FIGS. 11 to 14, 21 and 22 are respective images of before and after embossing (or ribbed precursor and embossed separator) of at least selected embodiments of the present invention.
Figure 12:
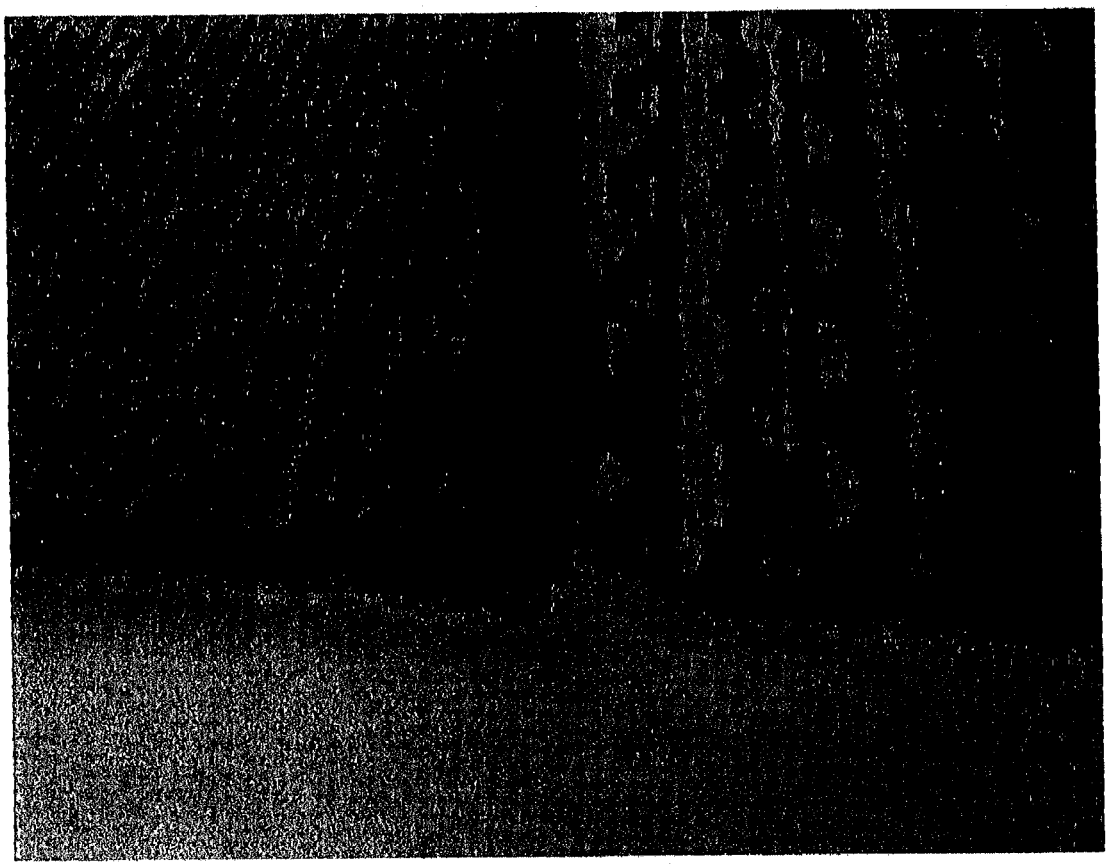
Figure 13:
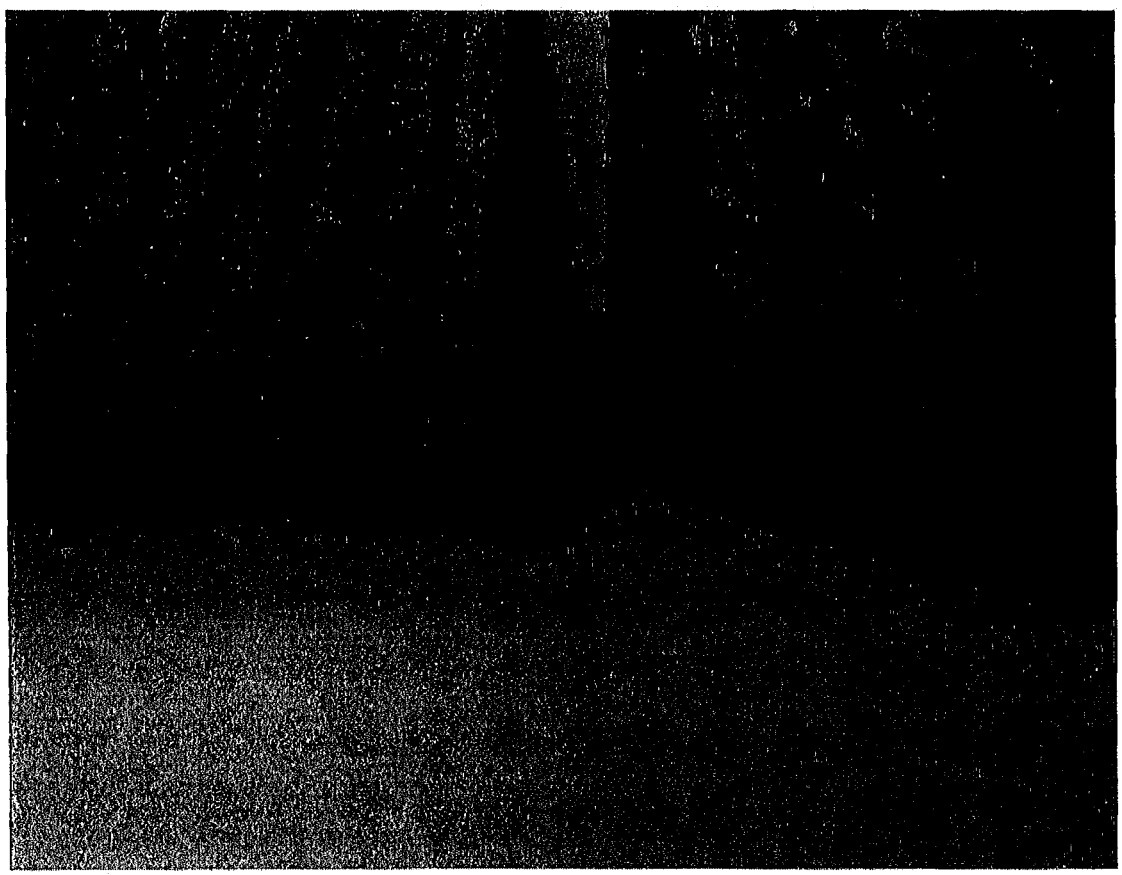
Figure 14:
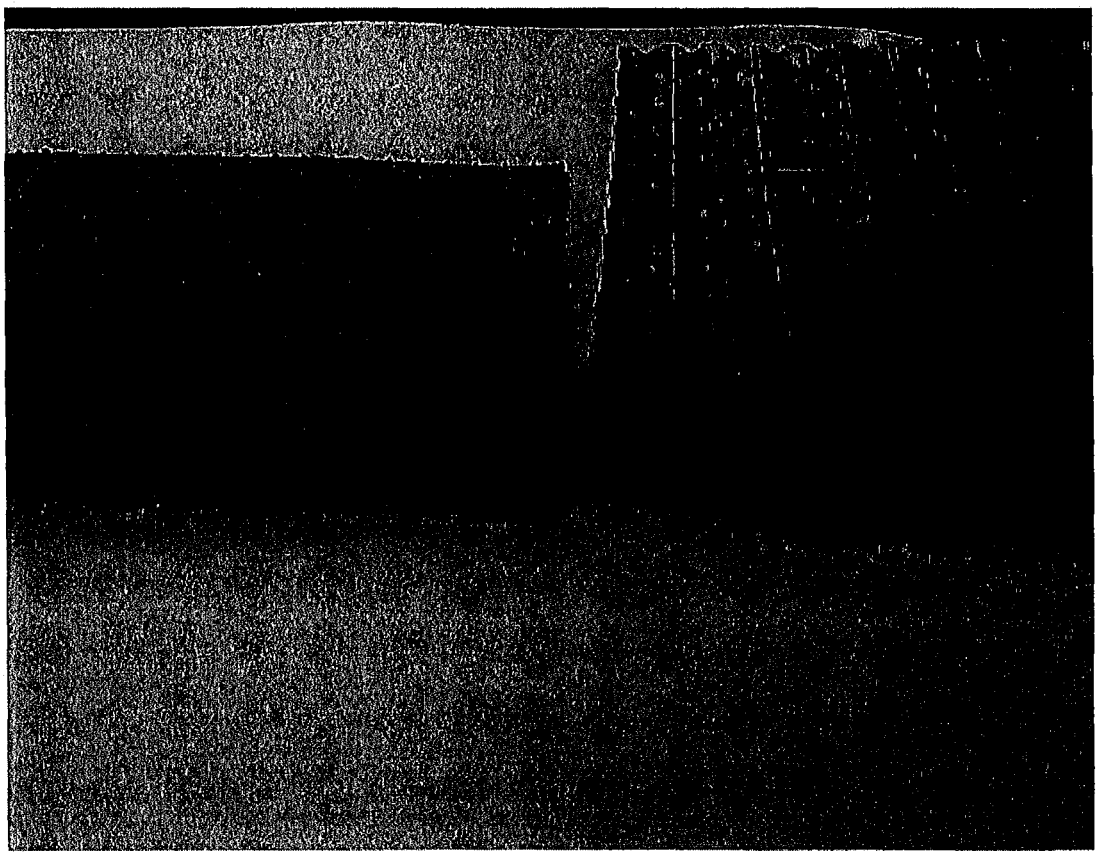
Figure 15:
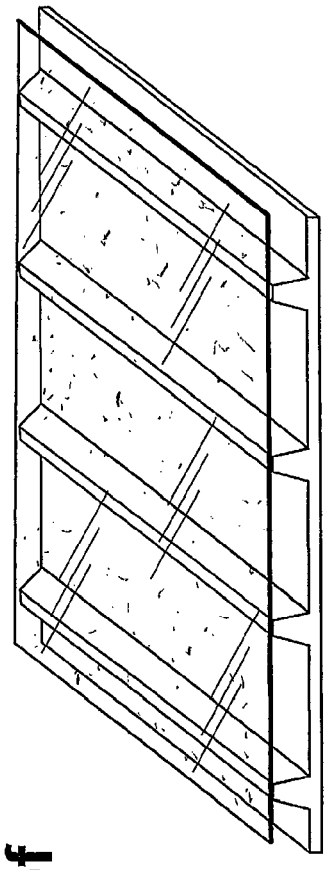
FIG. 15 is a perspective view of an example of a laminate or composite precursor (before embossing).
Figure 19:
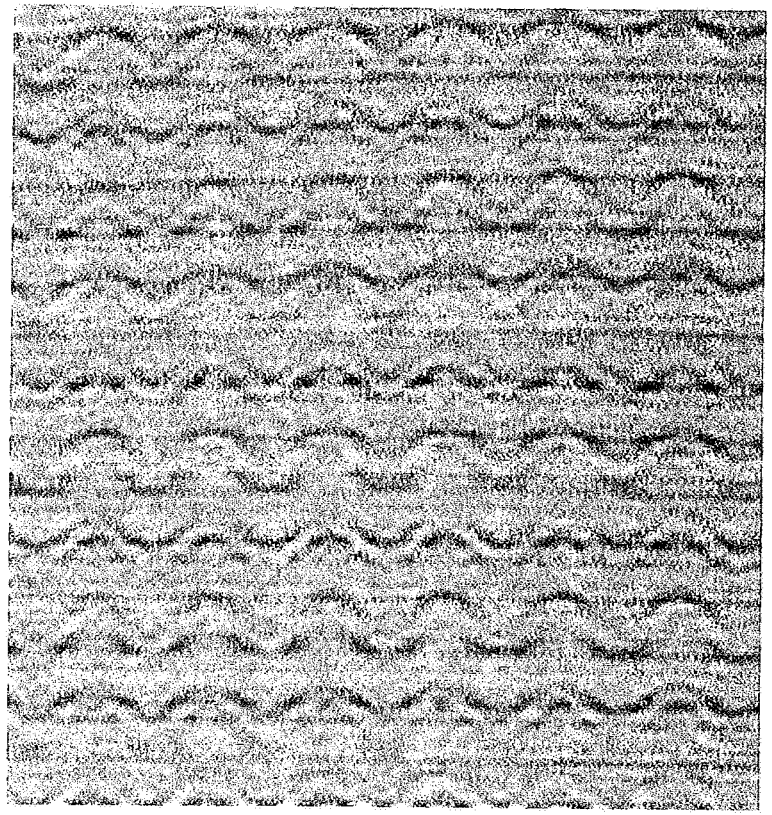
Figure 20:
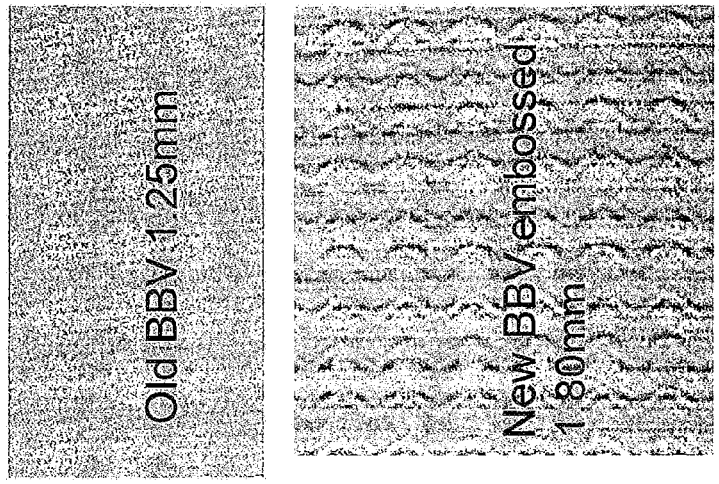
Figure 21:
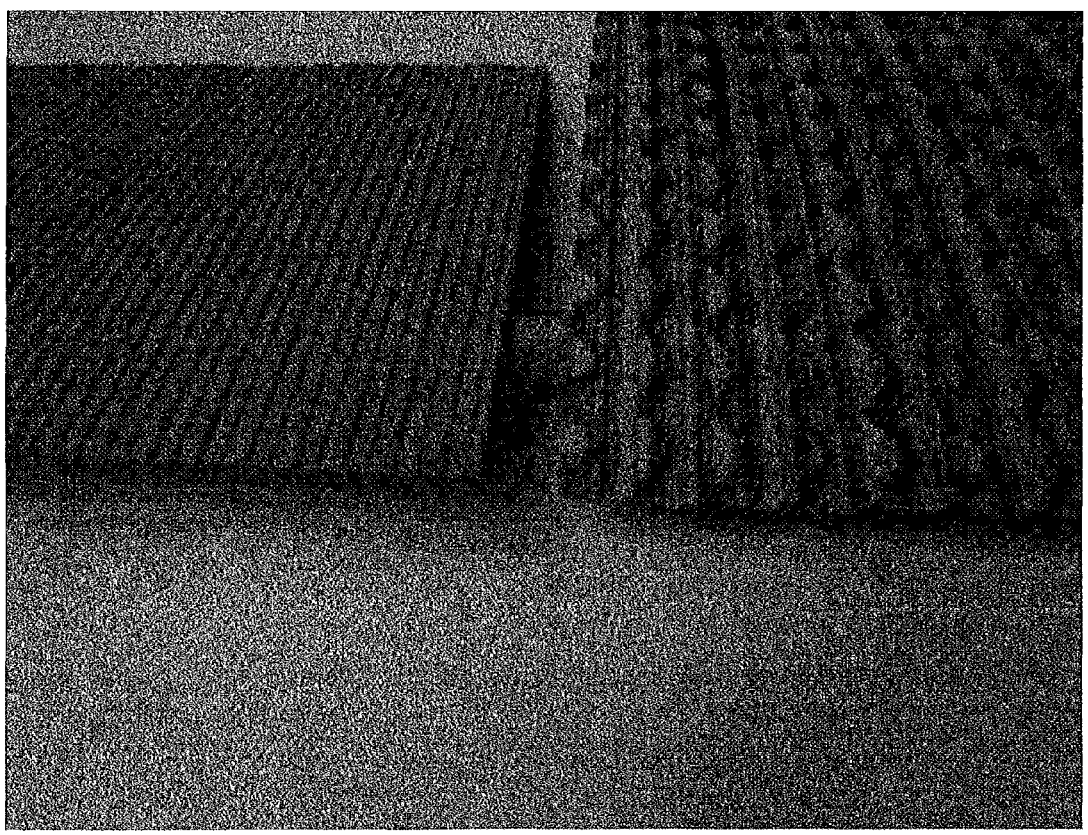
Figure 22:
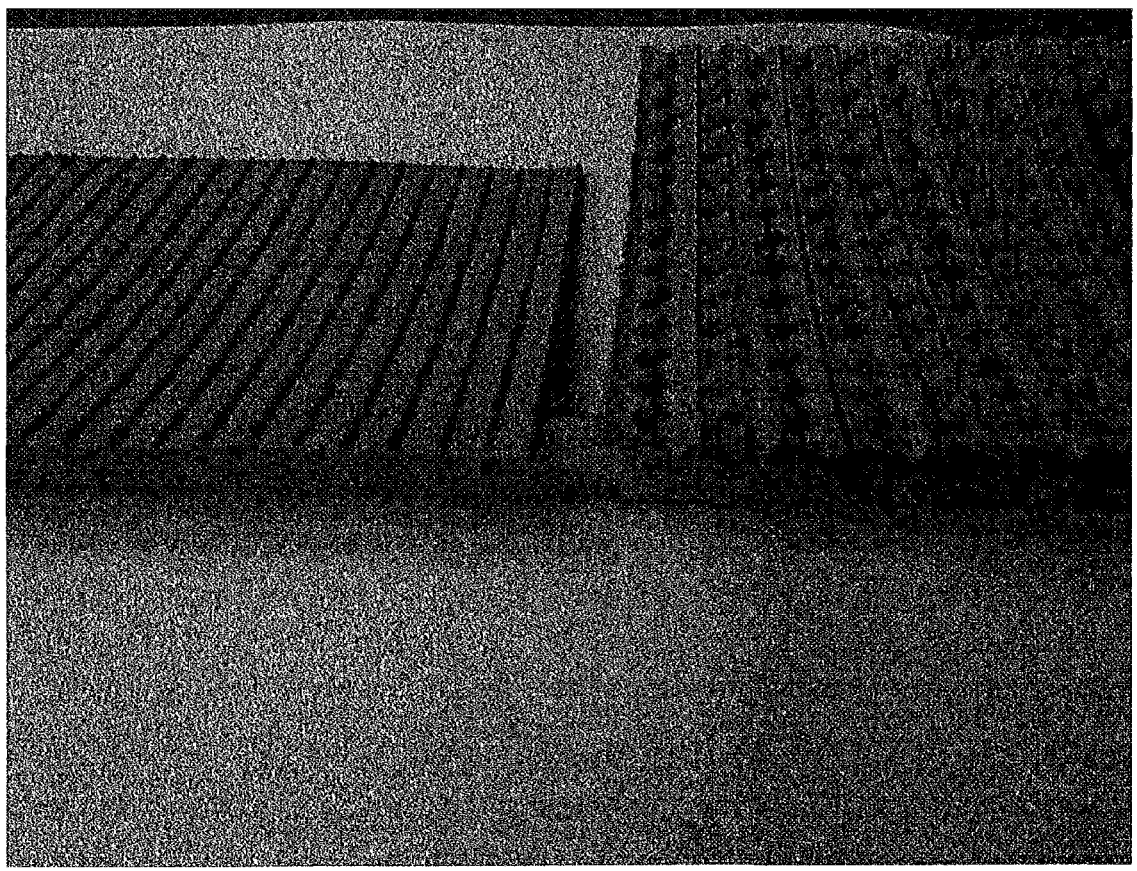

In accordance with at least certain examples, embodiments or aspects of the present invention, an embossed 1 mm thick ribbed separator precursor (embossed to have a final product 2 mm thickness) can replace a conventional 2 mm ribbed separator (providing reduced cost, mass, and/or complexity, and increasing manufacturing capacity significantly).

In accordance with at least certain embodiments or aspects of the present invention, the ability to impart thickness at the finishing step of the separator production process adds flexibility to the process. For example, products over 1 mm up to 2 mm could see a significant drop in mass and cost and conversely an increase in production speed. The shipping of a thinner precursor (prior to embossing) would also reduce precursor shipping volume and cost.

In accordance with at least selected embodiments or aspects of the present invention, new embossed ribbed separators are manufactured by slot die extrusion of a thermoplastic into a film that is then calender rolled into a ribbed sheet material with the prescribed rib profile (on one or both sides), after which the pore former, such as mineral oil, is extracted and the ribbed sheet material (calender ribbed precursor) so formed is wound into rolls. This porous ribbed sheet material is later drawn off the roll, embossed (to, for example, add thickness or densify) and cut into strips of the desired width. These embossed strips are cut to the desired length and then folded over either a positive or a negative electrode plate to form an embossed envelope, the two peripheral regions of which can be joined by, for example, heat sealing, pressure welding or other known processes. Electrode plates are then assembled into groups for a storage battery, plates in embossed separator envelopes alternating with plates of opposite polarity without envelopes. In general, only electrode plates of a single polarity are placed in envelope separators; in special cases, however, electrode plates of both polarities can be placed in envelope separators. The electrode plates within a group are then aligned and joined together.

The preferred goal of the separator is to keep the plate distance the same over time. The present embossed PE separators have very little change over time so they maintain the desired thickness and plate spacing over time. A change in thickness, resiliency, compression, or the like of less than or equal to 5% is preferred and is inside typical battery separator overall thickness specifications.

In accordance with at least selected co-embossment embodiments, additional rollstock material may enter the embossment process simultaneous to the ribbed separator membrane described above. Examples of such materials are not limited to fibrous nonwovens of synthetic, cellulosic or hybrid non-woven combinations thereof. The non-woven materials comprise a wide range of thicknesses, denier, basis weights, and surface chemistries. Of particular interest are non-woven compositions utilized as foundations for active material deposition within the battery manufacturing process. These non-wovens, commonly known as pasting papers may be functionalized chemically or may be treated in such a manner as to adhere particulate material with capability to produce gelling structures through which electrolyte is captured and held in situ in juxtaposition to the electrode surface thereby providing potential benefit in battery electrochemical performance.

In addition to gelling agents adhered to materials undergoing co-embossment with the separator membrane, other materials may be deployed that have impact on battery performance. These materials include but are not limited to, Sodium Sulfate to enhance electrolyte properties, chemically active minerals to scavenge contaminates from electrolyte and carbonaceous materials to enhance charge acceptance properties and enhance surface area.

A possibly preferred benefit within a co-embossment embodiment is the replacement of fixatives to attach laminate materials to the separator surface. The fixatives such as industrial glues contain organic compounds which provide a source of total oxidizable carbon (TOC) to the battery system. Many organic compounds become electrochemically unstable upon sustained exposure to the oxidizing environment of the battery resulting in TOC levels that may contribute to premature failure of the battery. Over the cycle life of a battery, the adhesives utilized may break down under oxidative attack allowing laminate materials to become free from the separator.

Yet another possibly preferred benefit from a co-embossment embodiment is the physical strength enhancement achieved by producing a monolithic structure comprised by such co-embossed materials. Biaxial stiffness, enhanced oxidation resistance and enhanced fluid transport properties (laterally and in the Z axis) may be positively affected.

The embossed ribs, patterns, deigns, features, and/or properties are not limited, may be varied by varying the embossing tooling, the materials being embossed, any additives or agents, and/or the like.

The preferred embossed separator may be an envelope or pocket, a cut piece or leaf separator, or a wrapping, envelope, pouch, pocket, with an optional laminate, glass mat, or synthetic non-woven, and may have minor transverse cross-ribs on the opposite face of the separator as the major longitudinal ribs (at least prior to embossing).

In accordance with at least selected embodiments, the invention also relates to a method for producing such an embossed battery separator, in at least one embodiment, the method comprising the steps:

a) providing a sheet material being made of a thermoplastic polymer and having a longitudinal direction and a width direction and side edges parallel to the longitudinal direction, said sheet material having longitudinal main ribs extending in the longitudinal direction and being formed integrally with the sheet material on at least one side of the sheet material, whereby the main ribs have a distance with respect to each other and whereby the sheet material has a microporous structure having a porosity, b) feeding the sheet material in longitudinal direction into an embossing device, and c) embossing the ribbed sheet material with a larger rib pattern using opposed male and female rollers to provide thicker separator, a densified structure, and/or the like.

Preferably, by embossing the ribbed sheet material in the methods of the invention, the structure in the ribbed regions is densified and the porosity is lowered compared to the average porosity of the microporous structure of the sheet material between the ribs.

There is no restriction with respect to the pattern or direction of the embossed ribs (they may be sinusoidal as shown, diagonal, straight, curved, or the like).

In principle, all acid-resistant thermoplastic polymers are suitable for the sheet materials of the separators according to the invention. Preferred thermoplastic polymers are polyvinyl chloride, polyethylene and polypropylene, polyethylene of high molecular weight (e.g., ultra high molecular weight polyethylene, UHMWPE) is particularly preferred. The sheet materials may also be manufactured with the addition of inorganic fillers such as amorphous silica oxides with the composition and manufacture of sheet materials of this type being known from the prior art. Representative formulations may be found in U.S. Pat. Nos. 3,351,495, 5,230,735, and 7,445,735, each is incorporated herein by reference.

In accordance with at least selected embodiments, objects, examples, or aspects of the invention, the present invention relates to or there are provided improved, new, modified, and/or more robust embossed battery separators, separator envelopes, composites, laminates, batteries, and/or methods, improved, new, modified, and/or more robust embossed battery separators, separator envelopes, batteries, and/or methods for storage batteries, methods of production, envelope embossed separators, batteries including the embossed separators and/or envelopes, and/or related methods for the production and/or use of the embossed separators, embossed envelopes, and/or batteries including such embossed separators and/or envelopes, improved, new, modified, or more robust embossed battery separators for lead-acid or storage batteries, methods for production, envelope embossed separators, batteries including the embossed separators and/or envelopes, and/or related methods for the production and/or use of the embossed separators, embossed envelopes, and/or batteries including such embossed separators and/or envelopes, and/or the like.

The present invention may be embodied in other forms without departing from the spirit and the essential attributes thereof, and, accordingly, reference should be made to the appended claims, rather than to the foregoing specification, as indicating the scope of the invention. For example, an improved battery may include a plurality of the battery separators or envelope separators of the present invention.

We claim:

1. A battery separator for a storage battery comprising:
a microporous membrane having at least one embossed rib and a densified rigid internal skeletal frame;
wherein said at least one embossed rib runs in a longitudinal direction; and
wherein said densified rigid internal skeletal frame comprises compressed transverse ribs of lesser height than said at least one embossed rib.

2. The battery separator of claim 1 wherein said at least one embossed rib is sinusoidal.

3. The battery separator of claim 1 wherein said microporous membrane comprising a mixture of a thermoplastic polymer and a filler, and having a plurality of micropores therethrough.

4. The battery separator of claim 1 wherein said microporous membrane comprises a mixture of a thermoplastic polymer, a filler, and a pore former.

5. The battery separator of claim 1 wherein said microporous membrane exhibits a 5% or less change over time in a parameter selected from the group consisting of thickness, resiliency, and/or compression.

6. The battery separator of claim 1 further comprising a pasting paper adhered to at least one face of the microporous membrane.

7. The battery separator of claim 6 wherein said pasting paper comprises a nonwoven material.

8. The battery separator of claim 6 wherein said pasting paper comprises at least one rib co-embossed with said microporous membrane.

9. A battery comprising the separator of claim 8.

10. The battery separator of claim 6 further comprising a gelling agent adhered to said pasting paper.

11. A battery comprising the separator of claim 6.

12. The battery separator of claim 1 further comprising a nonwoven adhered to a face of the microporous membrane.

13. The battery separator of claim 12 wherein said nonwoven comprises at least one of a gelling agent, sodium sulfate, chemically active minerals, or carbonaceous materials.

14. The battery separator of claim 12 wherein said nonwoven comprises at least one rib co-embossed with said microporous membrane.

15. A battery comprising the separator of claim 14.

16. A battery comprising the separator of claim 12.

17. The battery separator of claim 1 further comprising co-embossed material adhered to a face of said microporous membrane.

18. The battery separator of claim 1 wherein said microporous membrane being in a form selected from the group consisting of an envelope, a leaf, or a wrapping.

19. A battery comprising the separator of claim 1.

20. The battery separator of claim 1 wherein said densified rigid internal skeletal frame comprises compressed membrane longitudinal calendered ribs of lesser height than said at least one embossed rib.

21. A battery comprising the separator of claim 20.

22. A battery separator for a storage battery comprising:
a microporous membrane having an embossed rib and a densified rigid internal skeletal frame;
wherein said embossed rib runs in a longitudinal direction;
wherein said densified rigid internal skeletal frame comprises compressed, calendered membrane longitudinal ribs and transverse ribs;
wherein said membrane longitudinal ribs are of lesser height than said embossed rib; and
wherein said membrane transverse ribs are of lesser height than said longitudinal ribs.

23. A battery comprising the separator of claim 22.

24. The battery separator of claim 22 further comprising a pasting paper adhered to a face of the microporous membrane.

25. A storage battery comprising the separator of claim 24.

26. The battery separator of claim 22 further comprising a nonwoven adhered to a face of the microporous membrane.

27. The battery separator of claim 26 wherein said nonwoven comprises least one of a gelling agent, sodium sulfate, chemically active minerals, or carbonaceous materials.

28. A storage battery comprising the separator of claim 27.

29. A storage battery comprising the separator of claim 26.

* * * * *